US007266506B2

(12) United States Patent
Thomas et al.

(10) Patent No.: US 7,266,506 B2
(45) Date of Patent: Sep. 4, 2007

(54) SYSTEM FOR MANAGING CUSTOMER COMMUNICATION BY APPROVING THE COMMUNICATION BASED ON A SET OF CRITERIA BEFORE DISTRIBUTING THE COMMUNICATION IN RESPONSE TO CUSTOMER'S NEED

(75) Inventors: William Trannon Thomas, Dacula, GA (US); Rodney Glen McCoy, Powder Springs, GA (US); Mary Elizabeth Hightower, Norcross, GA (US); Charles H. Vance, Atlanta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 868 days.

(21) Appl. No.: 10/438,455

(22) Filed: May 14, 2003

(65) Prior Publication Data
US 2004/0230686 A1 Nov. 18, 2004

(51) Int. Cl.
*G06Q 90/00* (2006.01)

(52) U.S. Cl. .......................................... 705/1; 709/206

(58) Field of Classification Search .................... 705/7, 705/27, 14, 1; 707/1; 709/206, 224
See application file for complete search history.

(56) References Cited

U.S. PATENT DOCUMENTS

| 3,694,584 | A | | 9/1972 | Gimbert ................... 179/18 D |
| 5,956,693 | A | * | 9/1999 | Geerlings ................... 705/14 |
| 6,073,112 | A | * | 6/2000 | Geerlings ................... 705/14 |
| 6,286,045 | B1 | * | 9/2001 | Griffiths et al. ............ 709/224 |
| 2002/0095399 | A1 | * | 7/2002 | Devine et al. ............... 707/1 |
| 2002/0188689 | A1 | * | 12/2002 | Chung ......................... 709/206 |
| 2003/0028451 | A1 | * | 2/2003 | Ananian ...................... 705/27 |
| 2003/0033179 | A1 | * | 2/2003 | Katz et al. .................... 705/7 |

* cited by examiner

Primary Examiner—Le Hien Luu
(74) Attorney, Agent, or Firm—Cantor Colburn LLP

(57) ABSTRACT

A method of managing a customer communication within a business is disclosed. The customer communication is generated in response to an identified need and input into a computerized database. The distribution of the communication is also tracked and the tracking information stored in the database.

12 Claims, 5 Drawing Sheets

FIG. 3B

SYSTEM FOR MANAGING CUSTOMER COMMUNICATION BY APPROVING THE COMMUNICATION BASED ON A SET OF CRITERIA BEFORE DISTRIBUTING THE COMMUNICATION IN RESPONSE TO CUSTOMER'S NEED

BACKGROUND OF THE INVENTION

The present disclosure relates generally to a customer communication, and particularly to the management of the communication prior to the distribution of the communication to a customer.

In a customer service oriented business, mass communications are sent to customers every day, in many forms, and by many people. Once these communications are sent, tracking them, knowing where they originated, what was communicated, how many communications were communicated, and who received the communications, may be of interest to the originator of the communication. Accordingly, it would be beneficial to have a method and system for managing customer communications.

SUMMARY OF THE INVENTION

In one embodiment, a method of managing a customer communication within a business is disclosed. The customer communication is generated in response to an identified need and input into a computerized database. The distribution of the communication is also tracked and the tracking information stored in the database.

In another embodiment, a system for managing a customer communication is disclosed. The system includes a computer having application software for generating the customer communication in response to an identified need, establishing a tracking mechanism for the communication, inputting the communication into a computerized database, tracking the distribution of the communication, storing the tracking information at the database, and notifying an internal department of the business regarding the communication.

BRIEF DESCRIPTION OF THE DRAWINGS

Referring to the exemplary drawings wherein like elements are numbered alike in the accompanying Figures:

FIGS. 3A-3B are exemplary user interfaces for interfacing with the system of FIG. 2.

DETAILED DESCRIPTION OF THE INVENTION

An embodiment of the invention provides a method of managing one of many customer communications that are sent to customers every day, in many forms, and by many people. Another embodiment of the invention provides a system for tracking sent communications in view of where they originated, what was said, how many communications were sent, and to whom were they sent. While the customer is typically viewed as an external customer serviced by the business, as herein portrayed, the customer may also be an intermediate customer contact such as a distributor or an internal department that is serviced by another internal department.

Figure 1:
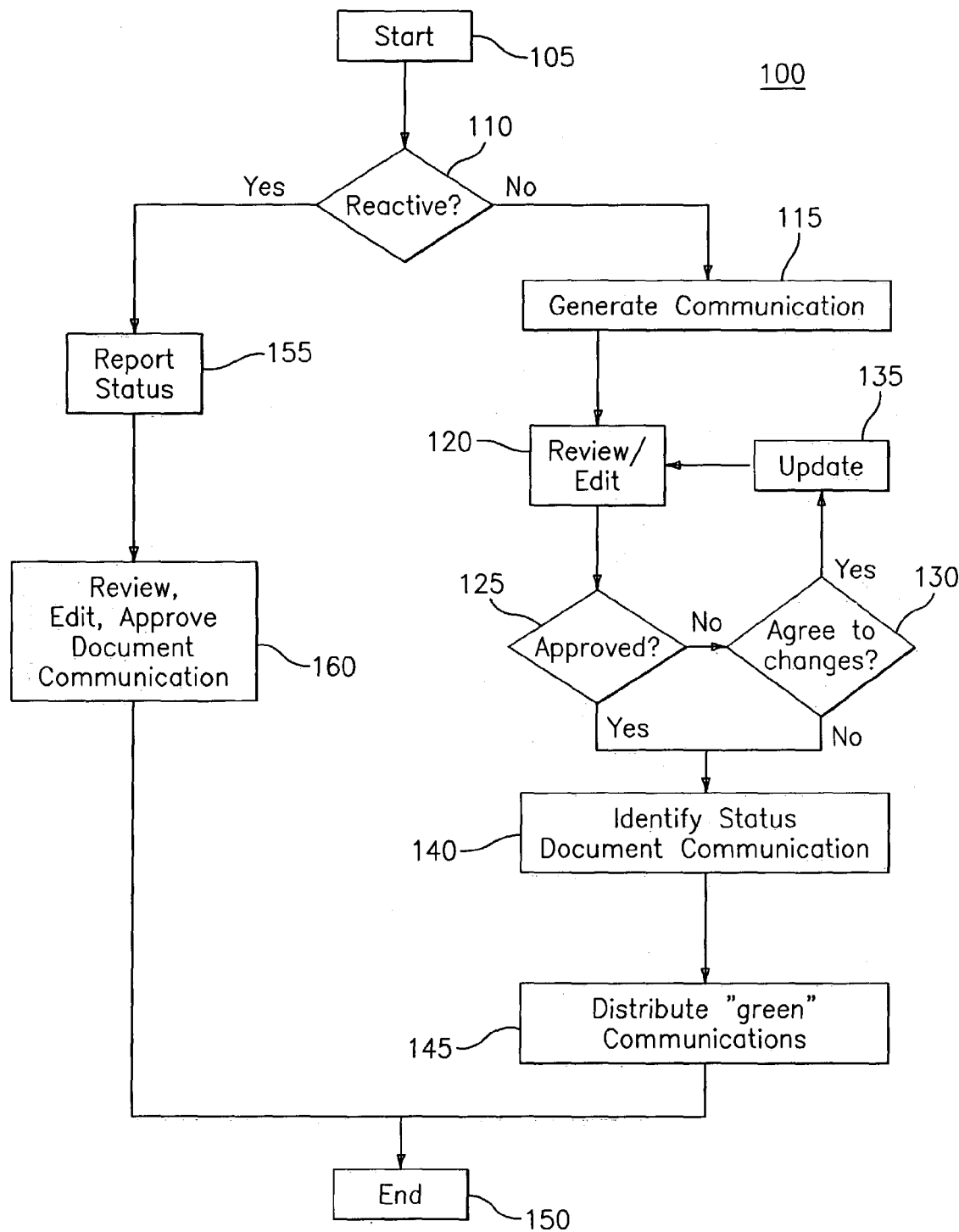
FIG. 1 is an exemplary method of managing a customer communication in accordance with an embodiment of the invention.

FIG. 1 depicts an exemplary method 100 of managing a customer communication originating from within a business. Examples of typical communications include, but are not limited to, promotional notices, discount opportunities and deadlines, device fixes and patches, and product offerings. By managing the customer communication prior to distribution of the communication to the customer, misrepresentation of the business to the customer may be avoided.

Figure 2:
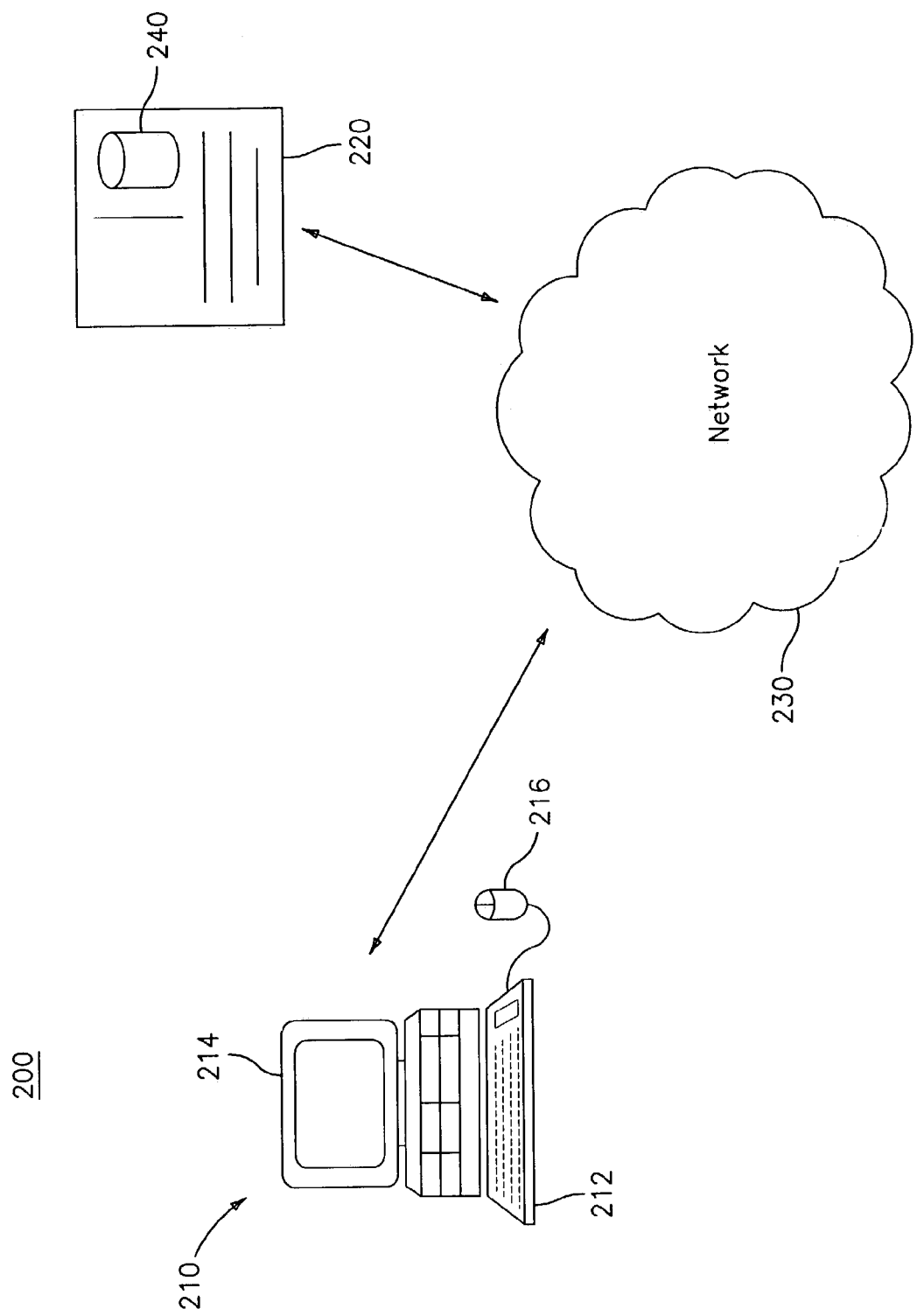
FIG. 2 is an exemplary system for implementing the method of FIG. 1.

Starting at 105, method 100 first determines 110 whether the communication that is to be sent to the customer is proactive to an identified need, or reactive to a preexisting situation or communication. If the communication is proactive, then method 100 proceeds to block 115 where the author of the communication generates the communication, which may be textual, illustrative, or interactive. The party responsible for generating a communication may be an individual, in which case that party may be referred to as an author, or a department, in which case that party may be referred to as a sponsor. Alternatively, a sponsor may be the one, person or department, who identifies the need for a communication, and the author may be the one, person or department, who writes the communication. A sponsor and an author may be the same person or different people. For simplicity, the term author will be used herein to refer to either an author or a sponsor. An exemplary system 200 for implementing an embodiment of the invention represented by method 100 is depicted in FIG. 2, which enables, as the artisan will appreciate, interactive communication with a customer via hyperlinks embedded within the communication, for example. As discussed above, the generation 115 of a communication is typically driven by an identified need, such as a promotional notice for example.

Referring now to FIG. 2, system 200 includes at least one computer 210 (which represents any number of computers for providing access to method 100), a server 220 (which represents any number of servers that may be arranged in signal communication with each other) for running application software that implements method 100, and a network 230 interconnecting computer 210 to server 220. In an embodiment, the application software may be coded in an Internet type language such as HTML for example, thereby providing user access to method 100 via a web site. Network 230 may be a hardwire connection arrangement, such as Ethernet for example, or a wireless arrangement, and may be a local area network (LAN), a wide area network (WAN), the Internet, or any other network arrangement suitable for implementing an embodiment of the invention. Server 220 may be a standalone computer or integrated with one of computers 210, and includes a database storage device 240 for storing information relating to method 100. Computer 210 includes an input keypad 212, a display device 214, and a pointing device 216, and is adapted for graphical user display and interface.

Figure 3A:
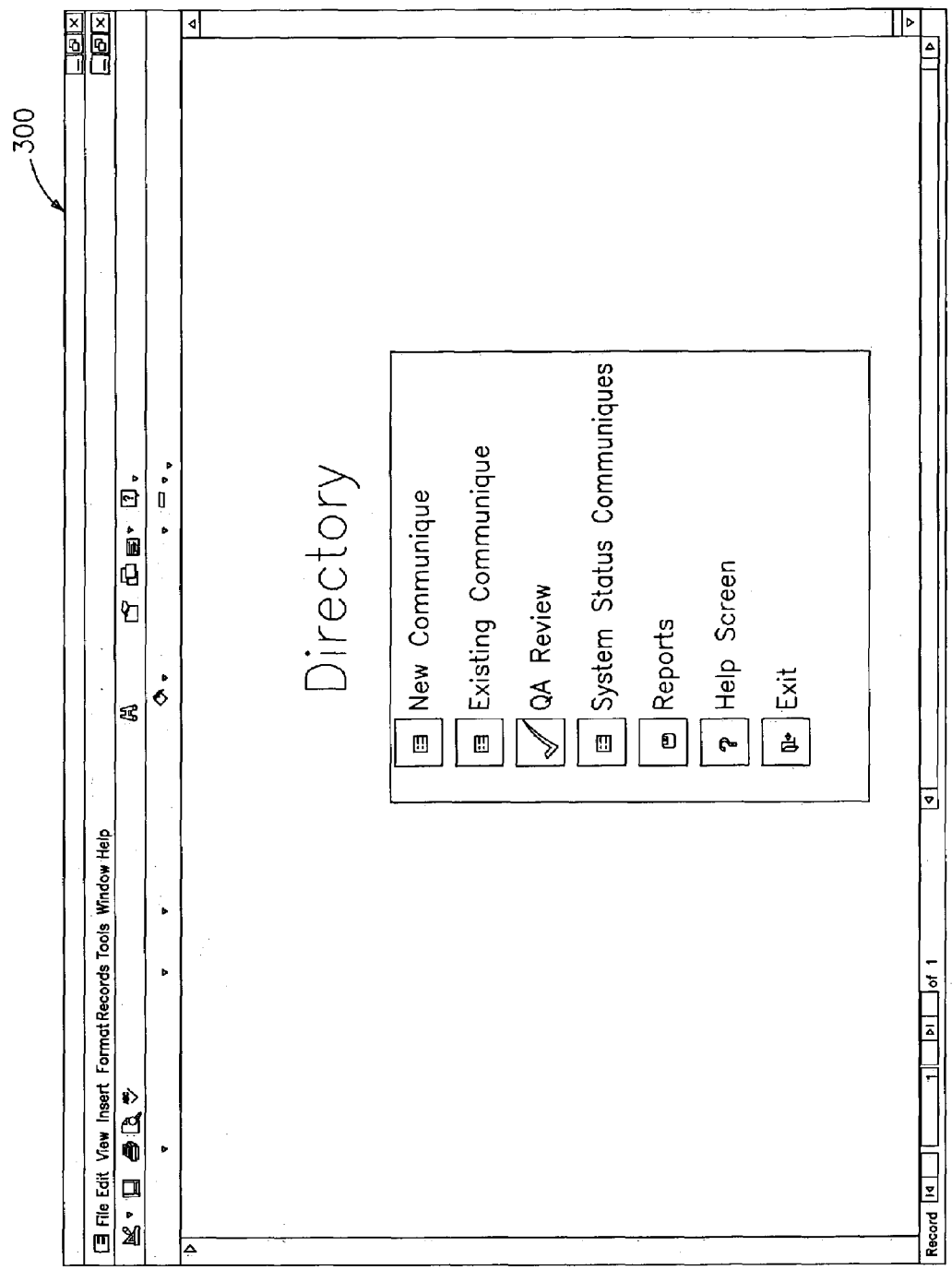
Figure 3B:
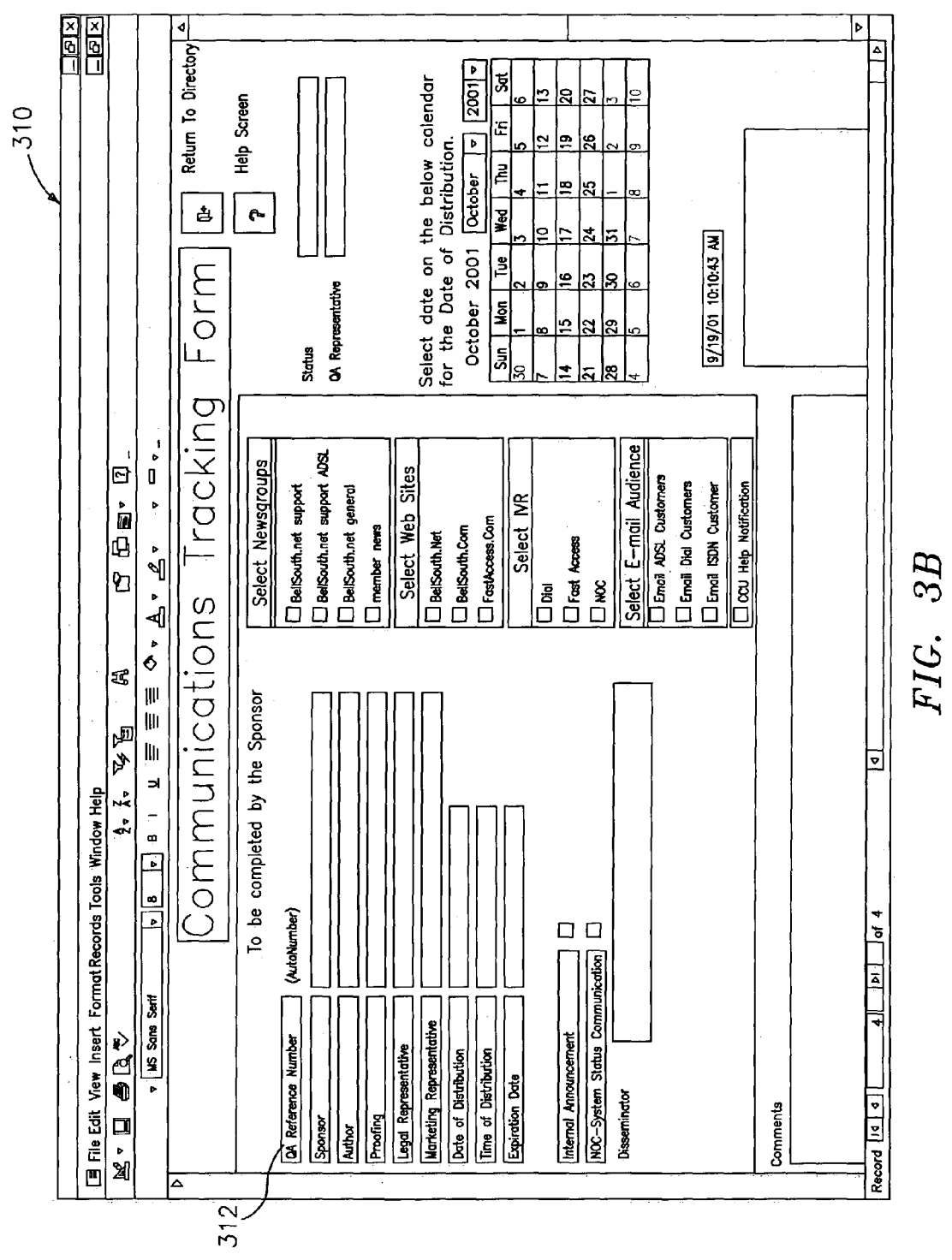

FIGS. 3A and 3B depict a graphical user display 300 and 310, respectively, for implementing method 100. User display 300 depicts an exemplary directory screen that is presented on display device 214 at the outset of method 100. As shown, various selectable options (via radio buttons and pull-down menus for example) are available to a user of method 100, including: new communiqué; existing communiqué; QA (Quality Assurance) Review; System Status Communiqués; Reports; Help Screen; and, Exit. Alternative embodiments of method 100 may include other selectable options not shown. User display 310 depicts an exemplary input screen entitled "Communications Tracking Form", which enables the user to generate 115 a communication and control how that communication is managed. While only two graphical user display screen shots 300, 310 are depicted in FIGS. 3A-3B, the artisan will appreciate that these are merely representative user display screens and that other user display screens may be made available to the user for practicing embodiments of the invention.

Referring now to FIGS. 1-3B collectively, a user accesses method 100 (in an embodiment, method 100 is implemented as application software running on server 220) via computer 210. To generate 115 a communication, the user navigates through user display 300 to user display 310, where the user preferably includes answers to "who", "what", "when", "where", and "how" questions in the communication. After the communication has been generated 115, method 100 saves the communication along with other input field information to database 220 and assigns a QA Reference Number 312 for subsequent tracking. Using the QA Reference Number 312, method 100 can track the distribution of the communication and save a tracking history of the communication to database 220. Once generated 115, method 100 notifies selected internal departments of the business (collectively referred to as QA) that a communication has been posted and requires review. In an embodiment, the QA team may be made up of members from various business functions, such as Marketing, Legal, Technology, and Production, for example. In an alternative embodiment, the QA team may be a dedicated person(s) who is separate from other functional departments within the company, thereby providing an objective view of the communication. Business functions may be excluded or others included as deemed appropriate by the user or business implementing method 100. At block 120, the QA team reviews and edits, if appropriate, the communication and makes a determination as to whether the communication is approved 125 for release to the customer or not. The review, edit, and approval processes 120, 125 are performed according to a predefined set of criteria, which includes, for example, "appropriate entry of a required input field", "usage of acceptable grammar and spelling", and "appropriate usage of business terminology". The review process 120 also includes reviewing the communication in view of other communications in order to avoid a conflict between communications, or to avoid an increase in customer inquiry that may result from a conflict between communications. A final approval 125 of the communication is received when legal sign-off is entered in method 100 via system 200, thereby associating a "green" status with the related QA Reference Number. Legal sign-off as herein used refers to an entry into method 100 by an individual having authority to act on behalf of a legal function and does not necessarily refer to an individual having attorney status.

If approval 125 is not received ("red" status), then method 100 passes to block 130 where the author of the communication reviews the suggested edits and determines whether to accept them or not. If the suggested edits are accepted ("green" status), then the author updates 135 the communication tracking form (CTF) 310 and method 100 proceeds to block 120 as discussed above. If approval 125 is received ("green" status), or the suggested edits are not accepted ("red" status), then method 100 passes to block 140 where the status of the communication is identified to the QA team, documented via communications tracking form 310, and saved at database 240. At block 145, the communication is distributed to the external customer if the communication has a "green" status and is archived at database 240 for subsequent disposition if it has a "red" status. Information relating to the communication is captured in communication tracking form 310, including the external customers that the communication was distributed to, for subsequent tracking and analysis. After external distribution of the communication, method 100 terminates at block 150.

If at block 110 it is determined that the communication is reactive, then method 100 passes to block 155 where the status of the communication is reported to database 240. Optionally, the QA team may be notified of the communication and may review, edit, approve and then document 160 any changes to the communication prior to its entry into database 240. After block 160, method 100 terminates at block 150.

Figure 4:
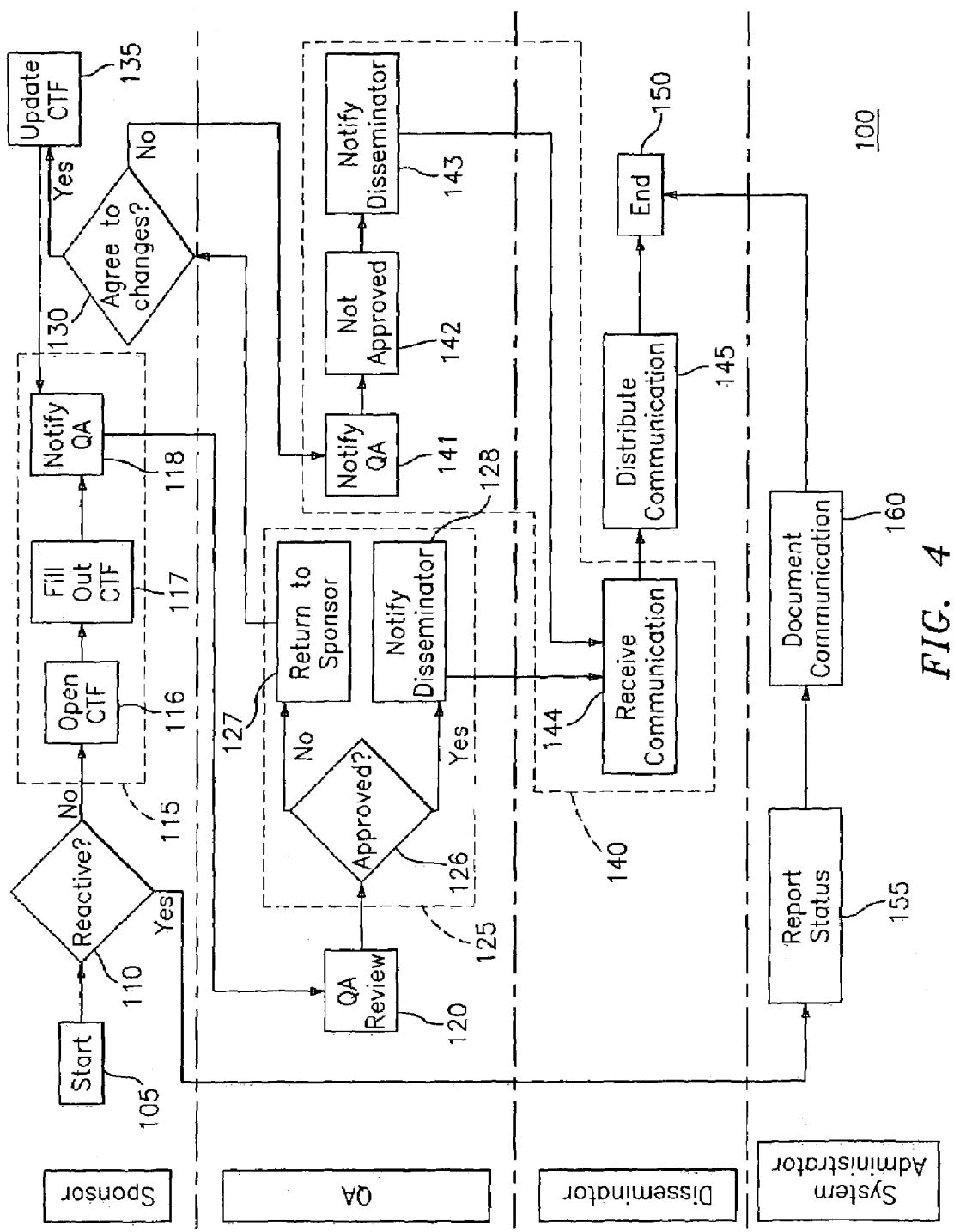
FIG. 4 is an exemplary expanded version of the method of FIG. 1.

A more detailed exemplary process flow for method 100 of FIG. 1 is depicted in FIG. 4, where like numerals are numbered alike. As depicted, FIG. 4 relates each activity of method 100 with a functional group. For example, the activities associated with blocks 105, 110, 115, 130, and 135 are performed by the author (sponsor), the activities associated with blocks 120, 125, and 140 (partially) are performed by the QA team, the activities associated with blocks 140 (partially), 145, and 150 are performed by the communication disseminator, and the activities associated with blocks 155 and 160 are performed by the system administrator. The communication disseminator is that party, individual or department, that is responsible for managing the distribution of the finished communication to the external customers. The system administrator is that party, individual or department, that is responsible for initially managing non-proactive communications, alternatively referred to as reactive communications.

Block 115 (generate communication) expands into: open communication tracking form (CTF) 116, which is accomplished via computer 210 and a web site accessible through application software running on server 220; fill out CTF 117, which is accomplished via graphical user displays 300, 310 and others (not shown); and, notify QA 118, which is accomplished via email notification either automatically by the application software or manually by the user. Block 125 (communication approved determination) expands into: communication approved determination 126, which is typically determined by the QA team; return communication to sponsor 127 if the communication is not approved; and, notify disseminator 128 if the communication is approved. Block 140 (identify status of communication, document communication, and save communication) expands into: notify QA 141 that the sponsor does not agree to the suggested changes, which is typically accomplished via email notification either automatically by the application software or manually by the user; identify communication status as not approved 142, which is typically accomplished by an entry made in CTF 310; notify disseminator 143, which is typically accomplished via email notification either automatically by the application software or manually by the user; and, receive notification at disseminator 144. When method 100 enters block 140, the process flow enters at block 141 from block 130, and enters at block 144 from block 128.

Some advantages of some embodiments of the invention include: ability to track and retrace the distribution of a communication; automated notification regarding the status of a communication; notification to call centers regarding a communication thereby providing the call center with prior knowledge that will enable the call center to better handle customer inquiries; reduced call volume to call centers that may have resulted from vague or conflicting communications; increased customer satisfaction through clearer communications; and, coordinated notification to business departments regarding customer communications for improved internal process flow.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of managing a customer communication within a business, comprising:
   generating the customer communication in response to an identified need;
   inputting the communication into a computerized database;
   tracking the distribution of the communication;
   storing the tracking information at the database;
   approving the communication in view of a predefined set of criteria;
   documenting the status of the communication; and
   distributing the communication to a customer.

2. The method of claim 1, further comprising: establishing a tracking mechanism for the communication; and notifying an internal department of the business regarding the communication.

3. The method of claim 1, wherein said approving further comprises at least one of reviewing and editing the communication.

4. The method of claim 3, wherein at least one of said reviewing, editing, and approving is performed by at least one individual associated with the internal department.

5. The method of claim 3, wherein said review further comprises:
   reviewing the communication in view of another communication thereby avoiding a conflict between communications or an increase in customer inquiry that may result from a conflict between communications.

6. The method of claim 1, wherein the predefined set of criteria comprises at least one of appropriate entry of a required input field, usage of acceptable grammar and spelling, and appropriate usage of business terminology.

7. The method of claim 1, wherein the customer communication answers at least one of a who, what, when, where and how question.

8. The method of claim 1, wherein said approving further comprises:
   receiving legal signoff of the communication.

9. The method of claim 1, further comprising:
   determining whether the communication is a proactive or a reactive communication and distributing the communication to an internal department of the business in accordance therewith.

10. A system for managing a customer communication, comprising a computer having application software for:
    generating the customer communication in response to an identified need;
    establishing a tracking mechanism for the communication;
    inputting the communication into a computerized database;
    tracking the distribution of the communication;
    storing the tracking information at the database; and
    notifying an internal department of the business regarding the communication
    wherein the computer has application software for;
    providing access to the communication by an individual of the internal department for reviewing, editing, or approving the communication in view of a predefined set of criteria;
    documenting the status of the communication; and
    distributing the communication to a customer.

11. The system of claim 10, further wherein the computer has application software for:
    receiving legal signoff of the communication.

12. The system of claim 10, further wherein the computer has application software for:
    directing the communication to a first internal department in response to the communication being a proactive communication, and to a second internal department in response to the communication being a reactive communication.

* * * * *